United States Patent [19]
Tebbens et al.

[11] 4,265,939
[45] May 5, 1981

[54] PARTICULATE RUBBER PROCESS

[75] Inventors: Klaas Tebbens; Erhardt Fischer, both of Sarnia, Canada; Jhy-Dou R. Lo, Pittsfield, Mass.

[73] Assignee: Polysar Limited, Sarnia, Canada

[21] Appl. No.: 100,396

[22] Filed: Dec. 5, 1979

[30] Foreign Application Priority Data
Jul. 19, 1979 [CA] Canada .................................. 332149

[51] Int. Cl.³ .............................................. B44D 1/02
[52] U.S. Cl. ..................................... 427/222; 525/902
[58] Field of Search ........................ 427/222; 428/407; 525/902

[56] References Cited
U.S. PATENT DOCUMENTS
3,813,259  5/1974  Neubert ............................... 427/222

Primary Examiner—Sam Silverberg
Attorney, Agent, or Firm—Stevens, Davis, Miller & Mosher

[57] ABSTRACT

A process is described for the production of particulate rubber wherein a synthetic rubber in latex form is coagulated to yield small particles and the particles are then coated with a rubbery-resinous or resinous polymer, the mixing conditions for each of the coagulation and coating being within certain limits of Reynolds Number and residence time. Such particulate rubber may be used for the manufacture of articles such as tire components or hoses and gaskets.

13 Claims, 6 Drawing Figures

PARTICULATE RUBBER PROCESS

This invention relates to an improved process for the manufacture of particulate rubber and more especially to an improved process for the production of particulate rubber by the coating of rubber particles with a rubbery-resinous or resinous polymer.

In the art there are descriptions of a variety of methods for the preparation of synthetic and natural rubber in particulate form. One method utilizes the principle of forming the rubber into small particles and coating or encapsulating the particles to prevent agglomeration or coalescence. Many variations of this method have been described, the variations being associated with how to form the small rubber particles and with what to use for the coating or encapsulation stage. However, it is well recognized that control of particle size is difficult to achieve and that efficiency of the coating or encapsulation stage is low. A second method comprises grinding solid rubber to yield small particles and coating of the particles to prevent agglomeration. This method is quite markedly energy intensive and therefore expensive.

We have now discovered an improved process for the manufacture of particulate rubber wherein a synthetic rubber in latex form is coagulated under conditions yielding small size particles and the small size rubber particles are then coated with a rubbery-resinous or resinous polymer.

Accordingly, it is an objective of this invention to provide an improved process for the manufacture of particulate rubber which comprises mixing an aqueous latex of a rubber with an aqueous coagulation agent followed by mixing the coagulated rubber particles so formed with a dilute aqueous latex of a rubbery-resinous or resinous polymer to cause coating of said rubber particles by said rubbery-resinous or resinous polymer and separating and recovering the particulate rubber, the improvement being that said mixture of said latex of the rubber with said coagulation agent occurs in a conduit wherein highly turbulent flow and short residence time are achieved and that said mixing of said rubbery-resinous or resinous polymer and said coagulated rubber particles occurs in a conduit wherein turbulent flow and short residence time are achieved.

In accordance with the invention, there is provided an improved process for the manufacture of particulate rubber which process comprises the steps of mixing an aqueous latex of a $C_4$-$C_6$ conjugated diolefin-containing rubbery polymer, said latex containing from about 10 to about 35 weight percent of said polymer, with an aqueous inorganic acid or inorganic salt coagulation agent, mixing the coagulated polymer particles so formed with a dilute aqueous latex of a rubbery-resinous or resinous styrene-containing polymer whereby the coagulated polymer particles are coated with the rubbery-resinous or resinous polymer, said dilute latex containing from about 1 to about 5 weight percent of said rubbery-resinous or resinous polymer and the quantity of said dilute latex being such as to provide from about 5 to about 15 parts by weight of rubbery-resinous or resinous polymer per 100 parts by weight of rubbery polymer, and separating and recovering the particulate rubber, the improvement being that said mixing of said rubbery polymer latex with said coagulation agent is in a conduit wherein there is turbulent flow as described by a Reynolds Number of from about 25,000 to about 100,000 and wherein the residence time is from about 0.05 to about 0.5 seconds, the temperature of the coagulation step being from about 49° to about 99° C., and that said mixing of the coagulated polymer particles with the dilute latex of the rubbery-resinous or resinous polymer is in a conduit wherein the flow is described by a Reynolds Number of from about 5,000 to about 25,000 and wherein the residence time is from about 0.5 to about 5 seconds, the temperature being from about 82° to about 99° C.

Rubbery polymers which may be used in the present process are $C_4$-$C_6$ conjugated diolefin-containing polymers. Suitable such $C_4$-$C_6$ conjugated diolefins include butadiene, isoprene and dimethyl butadiene. Suitable such $C_4$-$C_6$ conjugated diolefin-containing polymers include polybutadiene, polyisoprene, poly(dimethyl butadiene), butadiene-styrene copolymers, butadiene-alphamethylstyrene copolymers, isoprene-styrene copolymers, butadiene-acrylonitrile copolymers, butadiene-methacrylonitrile copolymers, isoprene-acrylonitrile copolymers, isoprene-methacrylonitrile copolymers, dimethyl butadiene-styrene copolymers, butadiene-styrene-divinyl benzene copolymers, butadiene-acrylonitrile-divinyl benzene copolymers, butadiene-styrene-unsaturated organic acid copolymers and the like. The latex of the rubbery polymer is preferably obtained by aqueous emulsion free radical polymerization of the monomers but may also be obtained by conversion of the solid or solution forms of the polymer into the latex form. Preferred rubbery polymers are butadiene-styrene copolymers containing from about 17 to about 35 weight percent of styrene and butadiene-acrylonitrile copolymers containing from about 20 to about 50 weight percent of acrylonitrile. The aqueous latex contains from about 10 to about 35 weight percent of the rubbery polymer.

Rubbery-resinous or resinous polymers suitable for use in the present process are styrene-containing polymers and include polystyrene, polymers of butadiene and styrene containing more than about 70 weight percent of styrene, polymers of butadiene, styrene and divinylbenzene containing more than about 70 weight percent of styrene and polymers containing from about 40 to about 60 weight percent of butadiene, from about 10 to about 20 weight percent of acrylonitrile and from about 30 to about 40 weight percent of styrene. Preferred resinous polymers are polystyrene, polymers of butadiene and styrene containing more than about 85 weight percent of styrene and preferred rubbery-resinous polymers are polymers of butadiene, acrylonitrile and styrene containing from 50 to 60 weight percent of butadiene, from 10 to 15 weight percent of acrylonitrile and from 30 to 35 weight percent of styrene.

A suitable butadiene-acrylonitrile-styrene polymer may be prepared by mixing butadiene and acrylonitrile in proportions of 75 to 100 parts by weight of butadiene with 0 to 25 parts by weight of acrylonitrile and emulsifying this mixture in water using an ionic micelle forming emulsifier, such as the alkali metal or ammonium salts of saturated or unsaturated carboxylic acids, or of rosin acids or disproportionated rosin acids, or of alkyl sulphates or sulphonates. This emulsion is fed to a reactor together with a free radical catalyst, activator and suitable modifiers. The polymerization is at a temperature of about 50° to about 70° C. and is continued to a conversion of at least 80, preferably at least 90, percent of the monomers. The so formed latex is subjected to an agglomeration process to increase the particle size of the latex to about 1500 to about 2500 Angstrom units.

Such agglomeration processes are well known in the art and include mechanical methods using a homogenizing device, chemical methods involving the addition of agglomerating agents such as polyvinyl ether, Carbowax or ionic salts, and physical methods using freeze agglomeration. The temperature of the agglomerated latex is raised to about 80° to about 90° C. and an emulsion in water is added of a mixture in the proportions of about 65 to about 80 parts by weight of styrene and about 20 to about 35 parts by weight of acrylonitrile, the amount of the styrene-acrylonitrile mixture being from 35 to 60 parts by weight per 65 to 40 parts by weight of butadiene-acrylonitrile polymer. The additional monomers are polymerized to at least 80, preferably at least 90, percent conversion to yield the rubbery-resinous polymer which is recovered by conventional methods as a stable latex. Suitable polystyrene, polymers of butadiene and styrene and polymers of butadiene, styrene and divinylbenzene may be prepared by aqueous emulsion free radical polymerization methods well known in the art. The aqueous latices may contain up to 35 weight percent of rubbery-resinous or resinous polymer but must be diluted for use in the present process such that the latex contains from about 1 to about 5 weight percent of polymer, preferably such that the latex contains from about 1.5 to about 3 weight percent of rubbery-resinous or resinous polymer. The amount of rubbery-resinous or resinous polymer latex in dilute form added to the process is such as to provide from about 5 to about 15, preferably from about 7 to about 12 parts by weight of rubbery-resinous or resinous polymer per 100 parts by weight of rubbery polymer.

Aqueous inorganic acid or inorganic salt coagulation agents for use in the present invention are those aqueous solutions well known in the art and include, as inorganic acids, hydrochloric acid and sulphuric acid with sulphuric acid being preferred, and, as inorganic salts, sodium chloride, calcium chloride, magnesium chloride, magnesium sulphate and aluminum sulphate with sodium chloride, calcium chloride or aluminum sulphate being preferred. Especially preferred coagulation agents are sodium chloride and sulphuric acid, alone or together, for use with butadiene-styrene rubbery polymer lattices and calcium chloride for butadiene-acrylonitrile rubbery polymer latices. The concentration of coagulation agent is from about 0.2 to about 1 weight percent in water for the inorganic salts and from about 2 to about 10 weight percent of inorganic acid in water.

The mixing of the latex of the rubbery polymer and of the coagulation agent takes place in a conduit under conditions of highly turbulent flow and short residence time. The temperature during this coagulation step is from about 49° to about 99° C. Preferably the temperature during the coagulation step is from about 75° to about 99° C., and most preferably from about 82° to about 99° C. The polymer latex will normally be supplied to the pipe at a temperature of from about 20° to about 65° C., preferably at a temperature of from about 20° to about 40° C. Because of the well known problems of instability of a latex with increasing temperature, it is preferred to control the temperature of the coagulation step by controlling the temperature of the aqueous coagulation agent. When the temperature of the coagulation step is above the temperature of the rubbery polymer latex, the temperature of the aqueous coagulation agent is adjusted to that necessary to provide the desired temperature during coagulation. Preferably the aqueous coagulation agent is supplied to the conduit at a temperature of from about 50° to about 100° C. and most preferably at a temperature of from about 85° to about 100° C. The ratio of the flow rate of aqueous coagulation agent to rubbery polymer latex is at least about 8:1, is preferably at least 10:1, and up to about 30:1. Because of the high flow rate of the aqueous coagulation agent as compared to the flow rate of the rubbery polymer latex, control of the temperature during the coagulation step is readily achieved by control of the temperature of the aqueous coagulation agent.

The mixing of the coagulated polymer particles with the dilute latex of the rubbery-resinous or resinous polymer takes place in a conduit wherein there is turbulent flow and a fairly short residence time. The temperature during this step is from about 82° to about 99° C., preferably from about 85° to about 99° C. The latex of the rubbery-resinous or resinous polymer will normally be supplied to the conduit at a temperature of about 20° to about 40° C. The temperature during this step of the process is largely controlled by the temperature of the stream coming from the coagulation step; as an alternative, steam can be added at this step in order to control the temperature. The mixing in the conduit is sufficient to distribute the dilute latex throughout the mixture of coagulated polymer particles and the aqueous phase in order that the rubbery-resinous or resinous polymer may coat the coagulated polymer particles but the mixing must not be too turbulent or it will cause removal of the polymer coating. There is a sufficient concentration of coagulation agent carried over from the coagulation step to cause the coagulation of the rubbery-resinous or resinous polymer, the coagulated rubbery-resinous or resinous polymer then predominantly coating the coagulated rubbery polymer particles already present.

Reynolds Number is a well known parameter used to describe the motion of a fluid. The Reynolds Number for a circular conduit is calculated from the equation Reynolds Number $= D \, v \, \rho/\mu$ where D is pipe diameter in cms, v is the flow velocity in cm/sec., $\rho$ is the density in $g/cm^3$ and $\mu$ is the viscosity in g/cm. sec. In the coagulation stage, the Reynolds Number is from about 25,000 to about 100,000, preferably from about 50,000 to about 100,000. The residence time in the coagulation stage is from about 0.05 to about 0.5 seconds, preferably from about 0.1 to about 0.3 seconds. In the coating stage, the Reynolds Number is from about 5,000 to about 25,000, preferably from about 7,500 to about 20,000. The residence time in the coating stage is from about 0.5 to about 5 seconds, preferably from about 1 to about 3 seconds.

The particulate rubber of the process of the present invention is in the form of particles which have the largest dimension such that at least 50 weight percent pass through a screen having apertures of about 1.75 mm dimension, preferably at least 50 weight percent pass through a screen having apertures of about 1.25 mm dimension, and most preferably the particle dimensions are such at at least 50 weight percent pass through a screen having apertures of about 1 mm dimension and also that at least 80 weight percent pass through a screen having apertures of about 2 mm dimension. The size characteristics of the particulate polymer may readily be determined by shaking a sample through a series of sieves having apertures of known dimensions and determining the weight of polymer retained on each screen.

Such particulate rubber may be used for the manufacture of articles well known in the industry, such as tire components and mechanical goods for styrene-butadiene polymers and hose, gaskets and o-rings for acrylonitrile-butadiene polymers. By the use of particulate rubber instead of the well known bales of rubber, the manufacturer of articles may use improved methods of handling and supply of the rubber to the various stages of mixing and may save some energy during the mixing stages.

Having now described certain aspects of the process of the invention, reference is made to the Figures which describe embodiments of apparatus for use in the present process.

Figure 1:
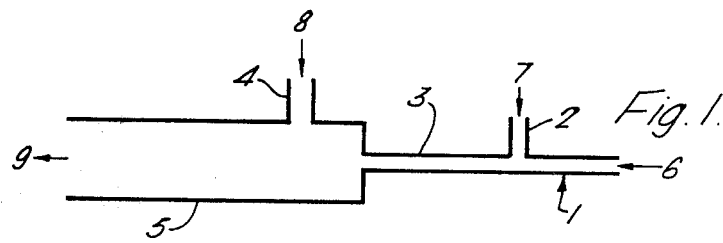
FIG. 1 is a schematic outline of pipe apparatus for coagulation and coating.

In FIG. 1, which is a schematic outline of pipe apparatus for coagulation and coating according to the present invention, line 1 is for supply of the rubbery polymer latex 6 and line 2 is for supply of the aqueous coagulation agent 7. The two streams mix in the coagulation pipe 3. Line 4 is for supply of the dilute resinous polymer latex 8. The dilute resinous polymer latex mixes with the coagulated rubbery polymer in pipe 5, wherein coating of the coagulated rubbery polymer particles by the resinous polymer occurs. The coated polymer particles are withdrawn from pipe 5 at 9.

Figure 2:
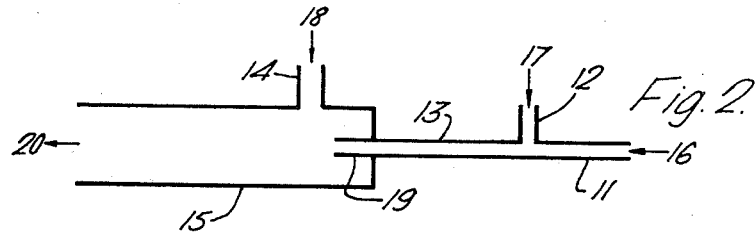
FIG. 2 is an alternative schematic outline of pipe apparatus for coagulation and coating.

An alternative schematic outline of pipe apparatus for coagulation and coating according to the present invention is shown in FIG. 2, where line 11 is for supply of the rubbery polymer latex 16 and line 12 is for supply of the aqueous coagulation agent 17. The latex and coagulation agent mix in the coagulation pipe 13. Line 14 is for supply of the dilute resinous polymer latex 18 to the coating pipe 15. Coagulated rubbery polymer particles flow from pipe 13 through extension pipe 19 into the coating pipe 15, extension pipe 19 terminating at about the point in coating pipe 15 where the resinous polymer latex enters through line 14. The whole is withdrawn from pipe 15 to 20.

Figure 3:
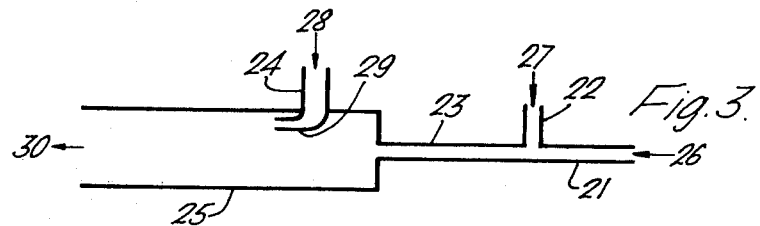
FIG. 3 is a further alternative schematic outline of pipe apparatus for coagulation and coating.

A further alternative schematic outline is shown in FIG. 3 of pipe apparatus for coagulation and coating according to the present invention. Rubbery polymer latex 26 enters through line 21. Aqueous coagulation agent 27 enters through line 22. The polymer latex and coagulation agent mix in the coagulation pipe 23 leading to the formation of coagulated rubbery polymer particles. Dilute resinous polymer latex 28 enters through line 24 which is connected to tube 29 entering the coating pipe 25 as a tube curved in the direction of flow of the fluids. The coated polymer particles dispersed in water leave the apparatus at 30.

Figure 4:
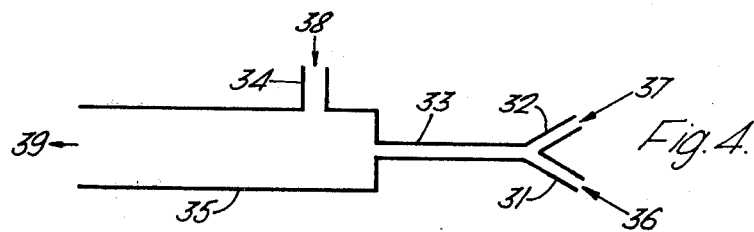
FIG. 4 is a further alternative schematic outline of pipe apparatus for coagulation and coating.

FIG. 4 shows a further alternative schematic outline of pipe apparatus for coagulation and coating according to the present invention. The rubbery polymer latex 36 enters through line 31 and the aqueous coagulation agent 37 enters through line 32. The latex and coagulation agent mix at the point where both streams enter the coagulation pipe 33 and the coagulated rubbery polymer particles then flow with the aqueous phase into the coating pipe 35. Dilute resinous polymer latex 38 enters the coating pipe through line 34. The coated polymer particles in water leave the apparatus at 39.

Figure 5:
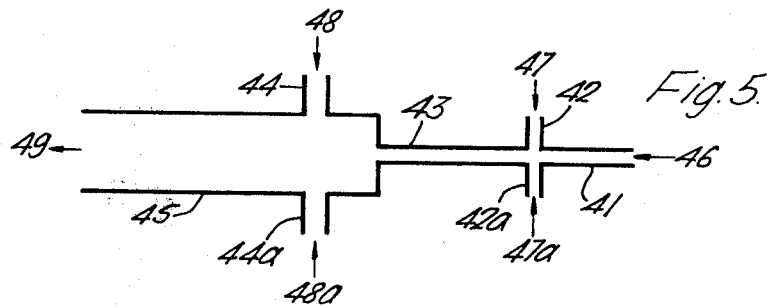
FIG. 5 is a further alternative schematic outline of pipe apparatus for coagulation and coating.

In FIG. 5 there is shown a further alternative schematic outline of pipe apparatus for coagulation and coating by the process of the present invention. Rubbery polymer latex 46 enters the apparatus through line 41. The aqueous coagulation agent 47 and 47a enters the apparatus through lines 42 and 42a. On mixing of the polymer latex and coagulation agent, coagulation of the polymer occurs in pipe 43. The coagulated polymer particles are carried in the aqueous phase into the coating pipe 45. Dilute resinous polymer latex 48 and 48a enters the coating pipe through lines 44 and 44a. The coated polymer particles are carried by the aqueous phase out of the apparatus at 49.

As will be apparent to one of average skill in the art, many other variations can be constructed of the apparatus shown in FIGS. 1 to 5. Preferably, the conduit is a pipe of essentially circular cross-section. The flow of the various streams is controlled by means well known and the temperature of the various streams may be adjusted by well known means. The turbulent flow required in the coagulation pipe is readily achieved by high flow rates through a relatively narrow diameter coagulation pipe; for example, for a coagulation pipe of about 1.5 cm internal diameter with a total flow of about 40 kg per minute (total of rubbery polymer latex plus aqueous coagulation agent) the Reynolds Number would be about 56,000. The turbulent flow required in the coating pipe is readily achieved by using a coating pipe of larger internal diameter than the coagulation pipe. For example, using a coating pipe of about 5 cm internal diameter, the Reynolds Number therein, using essentially a total flow in the coagulation pipe of about 42 kg per minute would be about 17,000. With the above flows, for a coagulation pipe of about 1.5 cm internal diameter and a length of about 38 cm, the residence time in the coagulation pipe would be about 0.1 seconds. Using a coating pipe of about 5 cm internal diameter and a length of about 26 cm, the residence time in the coating pipe would be about 1.0 seconds.

Figure 6:
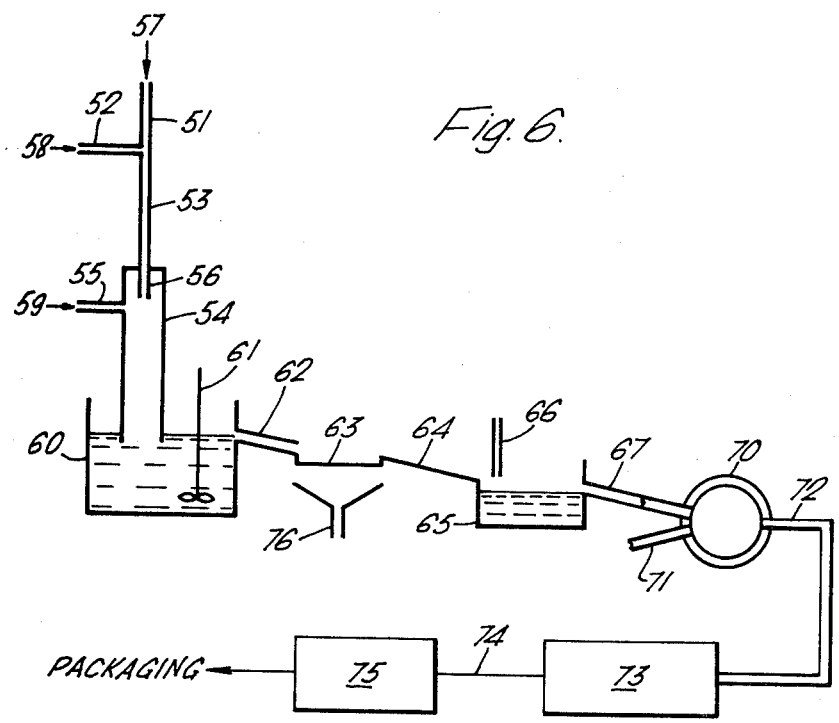
FIG. 6 is a schematic outline of pipe apparatus for coagulation and coating and for recovery of the particulate rubber.

FIG. 6 is a schematic outline of pipe apparatus for coagulation and coating according to the present invention and for recovery of the particulate rubber. Rubbery polymer latex 57 enters the apparatus through line 51 and aqueous coagulation agent 58 enters through line 52. The latex and coagulation agent mix in coagulation pipe 53. The coagulation pipe leads into the coating pipe 54, with an extension 56 of pipe 53 leading into the coating pipe such that the dilute resinous polymer latex 59 entering by line 55 contacts the effluent from the extension 56 at about the point of entry of the dilute resinous polymer latex into the coating pipe. The coated polymer particles leave the coating pipe and enter the water phase in tank 60, the liquid level in tank 60 being a few centimeters above the end of coating pipe 54. The water in tank 60 is agitated by stirrer 61. Overflow from tank 60 passes by line 62 to a separator 63. The separator may be a vibrating screen and separates the particulate rubber from the water, the water being collected in collector 76. From the separator, the particulate rubber is passed along the conveyor 64 of separator 63 to tank 65 which is supplied with fresh water from line 66 for washing of the particulate rubber. The particulate rubber passes from tank 65 by overflow 67 to centrifuge 70. The water separated by the centrifuge from the particulate rubber is removed at line 71 and the particulate rubber is passed by conveyor 72 to a fluid bed drier 73, in which the particulate rubber is dried to a final water content of less than about 1 weight percent. The dry particulate rubber is passed by line 74 to a dusting means 75 in which a small amount of a dusting agent such as fine particle silica is dusted onto the surface of the particles which are then conveyed to a packaging facility. As will be apparent to one of average skill in the art, many variations may be made with regard to the equipment used to provide the particulate rubber in packaged form.

The following examples illustrate the invention of the present application and are not to be construed as limiting the scope of the invention.

EXAMPLE 1

Particulate rubber was prepared using the coagulation and coating apparatus shown in FIG. 1 and the particulate rubber was recovered using the apparatus shown in FIG. 6 up to and including tank 65. The rubber particles from tank 65 were dried separately on laboratory equipment. The dry rubber particles were dusted with about 4 weight percent of silica prior to packaging. The resinous styrene-containing polymer used for the coating was the styrene-butadiene-acrylonitrile terpolymer, prepared as described previously, the terpolymer containing about 55 weight percent of butadiene, about 33 weight percent of styrene and about 12 weight percent of acrylonitrile. The rubbery polymer used was a butadiene-acrylonitrile polymer containing about 34 weight percent of acrylonitrile and having a Mooney (ML 1+4 at 100° C.) of about 50. The coagulation agent was a solution of calcium chloride in water. The temperature measured in the coagulation pipe was 90° C. The coagulation pipe 3 in FIG. 1 had an internal diameter of 1.02 cm and a length of 30.5 cm. The coating pipe 5 in FIG. 1 had an internal diameter of 5.25 cm and was 44 cm long, with 12 cm being below the water level of tank 60 of FIG. 6.

The data are shown in Table I and the particle size data clearly show that small particle sizes can be readily attained.

TABLE I

| Experiment No. | 1 | 2 |
|---|---|---|
| Polymer Latex solids wt % | 18.4 | 18.4 |
| Polymer Latex temperature °C. | 20–21 | 20–21 |
| Polymer Latex flow kg/min. | 2.72 | 2.72 |
| CaCl$_2$ concentration wt. % | 0.65 | 0.61 |
| CaCl$_2$ temperature °C. | 96 | 96 |
| CaCl$_2$ flow kg/min. | 36.3 | 36.3 |
| Coating Latex solids wt % | 2.09 | 2.09 |
| Coating Latex temperature °C. | 20–21 | 20–21 |
| Coating Latex flow kg/min. | 1.81 | 1.81 |
| Calculated Reynolds Number | | |
| (a) in coagulation pipe | 81000 | 81000 |
| (b) in coating pipe | 16500 | 16500 |
| Calculated Residence time | | |
| (a) in coagulation pipe seconds | 0.24 | 0.24 |
| (b) in coating pipe seconds | 1.21 | 1.21 |
| Particle size | | |
| d$_{50}$ mm | 0.75 | 1.01 |
| d$_{80}$ mm | 1.10 | 2.04 |

Note: d$_{50}$ equals screen size at which 50 wt. % of the particles pass through.
d$_{80}$ equals screen size at which 80 wt. % of the particles pass through.

EXAMPLE 2

Particulate rubber samples were prepared using the same apparatus of Example 1 except that the coagulation and coating apparatus was as shown in FIG. 2. The coagulation pipe 13 in FIG. 2 was 1.58 cm internal diameter and was 30.5 cm long from the point at which line 12 joins the coagulation pipe. Extension 19 was 7.6 cm long. The coating pipe was 36 cm long from the point at which line 14 joined the coating pipe and 10 cm of the coating pipe was below the water of tank 60 (FIG. 6). The polymers used were as described in Example 1 and the coagulation agent was calcium chloride dissolved in water. Table II contains the data for the experiments and the results of the particle size analysis. Experiments Nos. 21 and 22 illustrate that minor variations in the process parameters do not lead to significant difference in the product quality as shown by the particle size data. Experiment No. 23 shows that acceptable size particles can be obtained when the Reynolds Number in the coagulation pipe is 27300 and in the coating pipe is 9100. Experiments Nos. 24 and 26 illustrate that, in comparison with Nos. 21 and 22, higher flow rates and a temperature in the coagulation pipe of 83° or 84° C. yield particles of acceptable size. Experiment No. 25, which is a control outside the scope of the invention, shows that if the ratio of the flow rate of the aqueous coagulation agent to the flow rate of the rubbery polymer latex is less than about 8:1, the actual ratio in this experiment being about 4.34:1, particles of an unacceptable size are obtained.

TABLE II

| Experiment No. | | | 21 | 22 | 23 | 24 | 25 | 26 |
|---|---|---|---|---|---|---|---|---|
| Polymer latex | - solids | wt. % | 18.4 | 21.8 | 21.8 | 21.8 | 21.8 | 24.0 |
| | - temp. | °C. | 20–21 | 20–21 | 20–21 | 20–21 | 20–21 | 20–21 |
| | - flow | kg/min. | 2.72 | 2.09 | 2.09 | 4.17 | 4.17 | 4.08 |
| CaCl$_2$ | - solids | wt. % | 0.54 | 0.5 | 0.52 | 0.49 | 0.45 | 0.53 |
| | - temp. | °C. | 93 | 93 | 93 | 92 | 93 | 93 |
| | - flow | kg/min. | 43.0 | 45.4 | 18.1 | 36.3 | 18.1 | 38.5 |
| Coating latex | - solids | wt. % | 2.09 | 1.97 | 1.97 | 1.97 | 1.97 | 2.14 |
| | - temp. | °C. | 20–21 | 20–21 | 20–21 | 20–21 | 20–21 | 20–21 |
| | - flow | kg/min. | 1.81 | 2.34 | 2.34 | 4.68 | 4.68 | 3.45 |
| Calculated Reynolds Number | | | | | | | | |
| (a) Coagulation pipe | | | 61300 | 64000 | 27300 | 54500 | 30000 | 57300 |
| (b) Coating pipe | | | 16500 | 20100 | 9100 | 18250 | 10900 | 18600 |
| Calculated residence time | | | | | | | | |
| (a) Coagulation pipe | | seconds | 0.23 | 0.09 | 0.22 | 0.11 | 0.2 | 0.11 |
| (b) Coating pipe | | seconds | 1.21 | 0.94 | 2.08 | 1.04 | 1.74 | 1.02 |
| Temperature in coagulation pipe | | °C. | 89 | 87 | 87 | 84 | 84 | 83 |
| Particle size | | | | | | | | |

TABLE II-continued

| Experiment No. | | 21 | 22 | 23 | 24 | 25 | 26 |
|---|---|---|---|---|---|---|---|
| $d_{50}$ | mm | 0.82 | 0.81 | 1.77 | 1.18 | 2.44 | 1.07 |
| $d_{80}$ | mm | 1.14 | 1.18 | 2.84 | 1.79 | 3.66 | 1.65 |

What is claimed is:

1. An improved process for the manufacture of particulate rubber which process comprises the steps of mixing an aqueous latex of a $C_4$–$C_6$ conjugated diolefin-containing rubbery polymer, said latex containing from about 10 to about 35 weight percent of said polymer, with an aqueous inorganic acid or inorganic salt coagulation agent, mixing the coagulated polymer particles so formed with a dilute aqueous latex of a rubbery-resinous or resinous styrene-containing polymer whereby the coagulated polymer particles are coated with the rubbery-resinous or resinous polymer, said dilute latex containing from about 1 to about 5 weight percent of said rubbery-resinous or resinous polymer and the quantity of said dilute latex being such as to provide from about 5 to about 15 parts by weight of rubbery-resinous or resinous polymer per 100 parts by weight of rubbery polymer, and separating and recovering the particulate rubber, characterized in that said mixing of said rubbery polymer latex with said coagulation agent is in a conduit wherein there is turbulent flow as described by a Reynolds Number of from about 25,000 to about 100,000 and wherein the residence time is from about 0.05 to about 0.5 seconds, the temperature of the coagulation step being from about 49° to about 99° C., and that said mixing of the coagulated polymer particles with the rubbery-resinous or resinous polymer is in a conduit wherein the flow is described by a Reynolds Number of from about 5,000 to about 25,000 and wherein the residence time is from about 0.5 to about 5 seconds, the temperature being from about 82° to about 99° C.

2. The process of claim 1 characterized in that the rubbery polymer latex is at a temperature of from about 20° to about 65° C. and the temperature of the aqueous coagulation agent is from about 50° to about 100° C.

3. The process of claim 2 characterized in that the ratio of the flow rate of aqueous coagulation agent to rubbery polymer latex is at least about 8:1 and up to about 30:1.

4. The process of claim 3 characterized in that the temperature of the rubbery polymer latex is from about 20° to about 40° C., the temperature of the aqueous coagulation agent is from about 85° to about 100° C. and the temperature of the coagulation step is from about 82° to about 99° C.

5. The process of claim 4 characterized in that the Reynolds Number in the coagulation step is from about 50,000 to about 100,000 and the Reynolds Number in the coating step is from about 7,500 to about 20,000.

6. The process of claim 5 characterized in that the residence time in the coagulation step is from about 0.1 to about 0.3 seconds and the residence time in the coating step is from about 1 to about 3 seconds.

7. The process of claim 1 characterized in that the particulate rubber is in the form of particles which have the largest dimension such that at least 50 weight percent pass through a screen having apertures of about 1.75 mm dimension.

8. The process of claim 1 characterized in that the conduit is a pipe of essentially circular cross-section.

9. The process of claim 6 characterized in that the conduit is a pipe of essentially circular cross-section.

10. The process of claim 9 characterized in that the coating pipe has a larger internal diameter than the coagulation pipe.

11. The process of claim 6 characterized in that the rubbery polymer is a butadiene-styrene copolymer containing from about 17 to about 35 weight percent of styrene or a butadiene-acrylonitrile copolymer containing from about 20 to about 50 weight percent of acrylonitrile.

12. The process of claim 6 characterized in that the rubbery-resinous or resinous polymer is a resinous polymer selected from polystyrene and polymers of butadiene and styrene containing more than about 85 weight percent of styrene.

13. The process of claim 6 characterized in that the rubbery-resinous or resinous polymer is a rubbery-resinous polymer containing from 50 to 60 weight percent of butadiene, from 10 to 15 weight percent of acrylonitrile and from 30 to 35 weight percent of styrene.

* * * * *